United States Patent [19]

Goranson

[11] 4,133,439
[45] Jan. 9, 1979

[54] VEHICLE BODY LOADING AND UNLOADING MECHANISM

[75] Inventor: Paul L. Goranson, Knoxville, Tenn.

[73] Assignee: Carrier Corporation, Syracuse, N.Y.

[21] Appl. No.: 768,127

[22] Filed: Feb. 14, 1977

[51] Int. Cl.² .............................................. B60P 1/28
[52] U.S. Cl. ..................................... 214/505; 92/161
[58] Field of Search ............... 214/505, 517, 516, 506, 214/83.24, 83.22, 83.34; 92/161, 146; 248/55, 65

[56] References Cited

U.S. PATENT DOCUMENTS

| | | | |
|---|---|---|---|
| 1,885,399 | 11/1932 | Wren | 214/517 |
| 1,911,485 | 5/1933 | Axlund | 248/55 |
| 3,049,378 | 8/1962 | Nelson | 214/517 |
| 3,074,574 | 1/1963 | Prince | 214/505 |
| 3,214,046 | 10/1965 | Dempster et al. | 214/505 |
| 3,964,626 | 6/1976 | Arregui | 214/505 |
| 3,980,262 | 9/1976 | Lee | 248/55 |

Primary Examiner—Albert J. Makay
Assistant Examiner—Lawrence E. Williams
Attorney, Agent, or Firm—J. Raymond Curtin; Donald F. Daley; John S. Sensny

[57] ABSTRACT

A vehicle mounted apparatus for loading and unloading containers onto and off of the vehicle is disclosed. The apparatus comprises a tilting frame on the body of the vehicle, a hydraulic cylinder mounted on the tilting frame for longitudinal movement along the tilting frame and a cable extending from the tilting frame around a sheave mounted on the front of the hydraulic cylinder back to the container. The sheave is concentrically mounted on cross supports extending between guides in the tilting frame. Supports are provided on the tilting frame and cylinder to prevent vibration of the cylinder when the cylinder is in an extended position and the cylinder is detachable from the tilting frame for removal for maintenance or replacement purposes.

3 Claims, 11 Drawing Figures

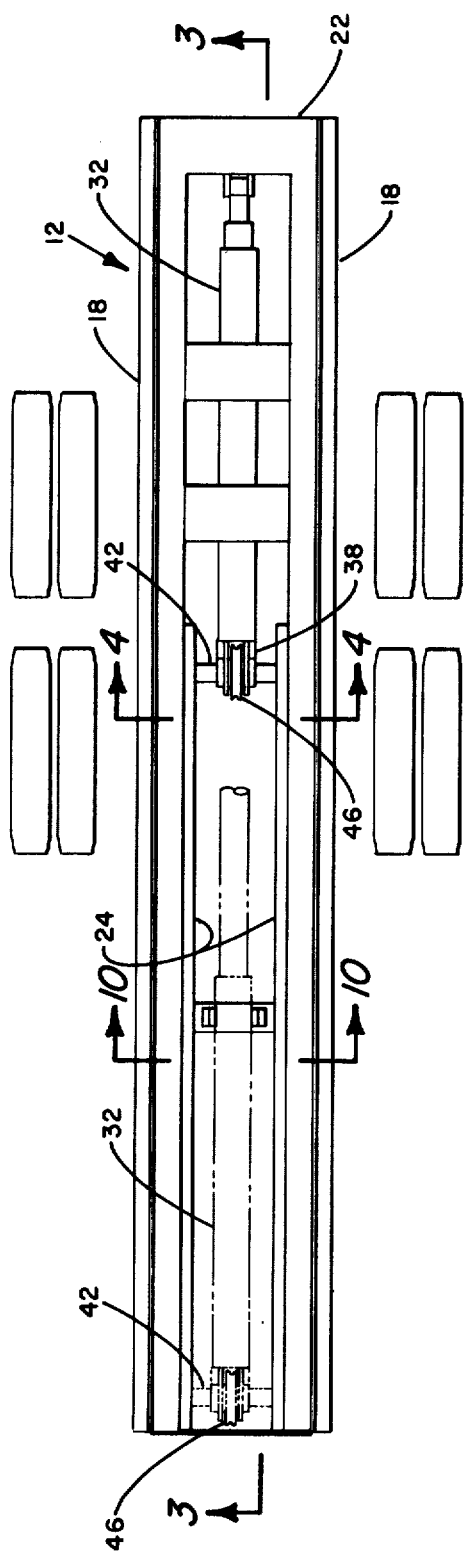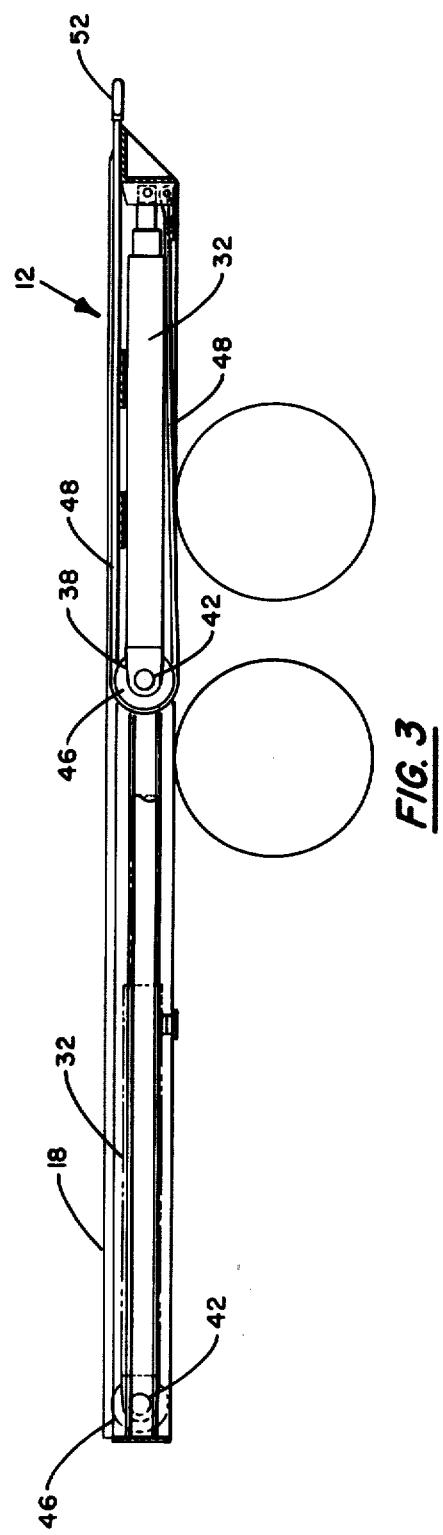

VEHICLE BODY LOADING AND UNLOADING MECHANISM

BACKGROUND OF THE INVENTION

This invention relates generally to improvements in vehicle body loading and unloading mechanisms for picking up large containers of the order of vehicle bodies and for loading and unloading such containers with respect to a transport vehicle, separable therefrom. More specifically this invention relates to a hydraulic mechanism mounted on a tilting frame of a vehicle body which is capable of extending and withdrawing a cable suitable for attachment to a large container for drawing the container onto the tilting frame and onto the vehicle body.

It is often desirable to use large capacity containers for holding various types of refuse or other material and to provide for the loading and unloading of such containers with respect to a transport vehicle. Such containers can be filled when sitting on the ground, floor or other surface after which they can be picked up or loaded by power, transported to a remote point, and then set down or unloaded. It is also possible to load the body separate and apart from the motor vehicle and then transport the loaded body to a remote point and disconnect it from the vehicle while still loaded.

Vehicles of the type used herein have conventionally used cables to draw the container up onto the vehicle body. The cable is usually operated from a winch which is driven by a separate motor. By tipping the tilting frame of the vehicle body into an upward position, the container can be allowed to slide off the vehicle under the restraints of the cable and the winch. The present invention relates to the use of a hydraulic cylinder to control the operation of the cable in drawing the container onto the vehicle or allowing it to slide off of the vehicle. Similar mechanisms of this type are disclosed in U.S. Pat. Nos. 3,049,378 and 3,964,626.

Hydraulic cable units are usually either the multi cylinder type as in U.S. Pat. No. 3,049,378 wherein the cable is passed over a series of sheaves to produce movement of the cable on the order of four times the movement of the hydraulic cylinder, or the single cylinder type as in U.S. Pat. No. 3,964,626 where large movement of the cylinder is necessary to produce the cable movement required. Construction and maintenance costs are higher in the type of construction which utilizes multiple sheaves whether one or two cylinders are used.

As the cable passes around a sheave and is attached to a container, it produces a resultant force at the center of the sheave which has two vectors, one parallel to the hydraulic cylinder and one perpendicular to the hydraulic cylinder. In the prior art construction of hydraulic cable rigs, the perpendicular vector of the resultant force produces a bending movement in the hydraulic cylinder. As can be seen in FIG. 3 of U.S. Pat. No. 3,964,626, the sheave or pulley is mounted forward of the crosshead. The cable tends to rotate the pulley about the crosshead causing a sag or bending in the cylinder. The longer the cylinder, the greater the bending and the greater the stress and wear on the cylinder.

The telescopic hydraulic cylinder in its extended position is, in the prior art, not extremely resistant to vertical and horizontal vibrations caused by rough roads and general vibration during travel. Typically, the pressure of the cylinder will hold the cylinder fully extended and square against the internal stop rings of the cylinder. However, if this pressure is relieved for some reason, the cylinder may vibrate during travel which leads to a shorter cylinder life. In the present invention cylinder vibration is reduced by means of lugs attached to the cylinder and supports or stops attached to a crossplate extending widthwise across the tilting frame. When the hydraulic cylinder is fully extended, the lugs rest on, or reside slightly above, the supports or stops.

Also, in the present invention, the bending on the cylinder is eliminated and the cylinder is readily removable from the frame of the vehicle. Removal of the cylinder for repair or overhaul purposes is usually a difficult time consuming task. The present invention facilitates the removal of the cylinder by merely removing one pin connection and sliding the cylinder and crossheads out of the crosshead guides.

SUMMARY OF THE INVENTION

Therefore it is the primary object of this invention to eliminate the bending forces in the hydraulic cylinder of a hydraulically operated cable type container transport vehicle.

It is also an object of this invention to provide a cable type container transport vehicle in which the cable is driven by a hydraulic cylinder and in which the unbalanced forces of the cable are taken up by the vehicle structure and not by the hydraulic cylinder.

It is also an object of this invention to facilitate the removal of the hydraulic cylinder for repair and maintenance purposes from a vehicle structure in a hydraulic cylinder operated cable type container transport vehicle.

It is also an object of this invention to extend the life of the telescopic hydraulic cylinder.

It is also an object of this invention to reduce the vibration of the telescopic hydraulic cylinder.

These and other objects of this invention are attained by means of a hydraulic cylinder, with attached lugs, mounted within the tilting frame of a container transport vehicle, by means of a removal pin at one end of said cylinder and a crosshead at the opposite end. A crossplate with stops or supports for the hydraulic cylinder lugs is attached widthwise across the tilting frame. The crosshead supports one end of the cylinder and rides in a pair of guide tracks in the tilting frame. A sheave is concentrically mounted on the crosshead to guide a cable from a fixed position on the tilting frame around or over the sheave and then to the rear of the tilting frame for attachment to a container. Stops or supports are mounted on the crossplate in a position to support, or rest slightly below, the cylinder lugs when the cylinder is in an extended position.

BRIEF DESCRIPTION OF THE DRAWINGS

For a better understanding of the invention as well as other objects and features thereof, reference is had to the following detailed description of the invention to be read in connection with the accompanying drawings, wherein:

FIG. 2 is a plan view of the tilting frame shown in FIG. 1 with the hydraulic cylinder shown in the extended position in dotted lines:

FIG. 3 is a side sectional view of the tilting frame taken along lines 3—3 of FIG. 2, with the hydraulic cylinder shown in the extended position in dotted lines;

DESCRIPTION OF THE PREFERRED EMBODIMENT

Figure 1:
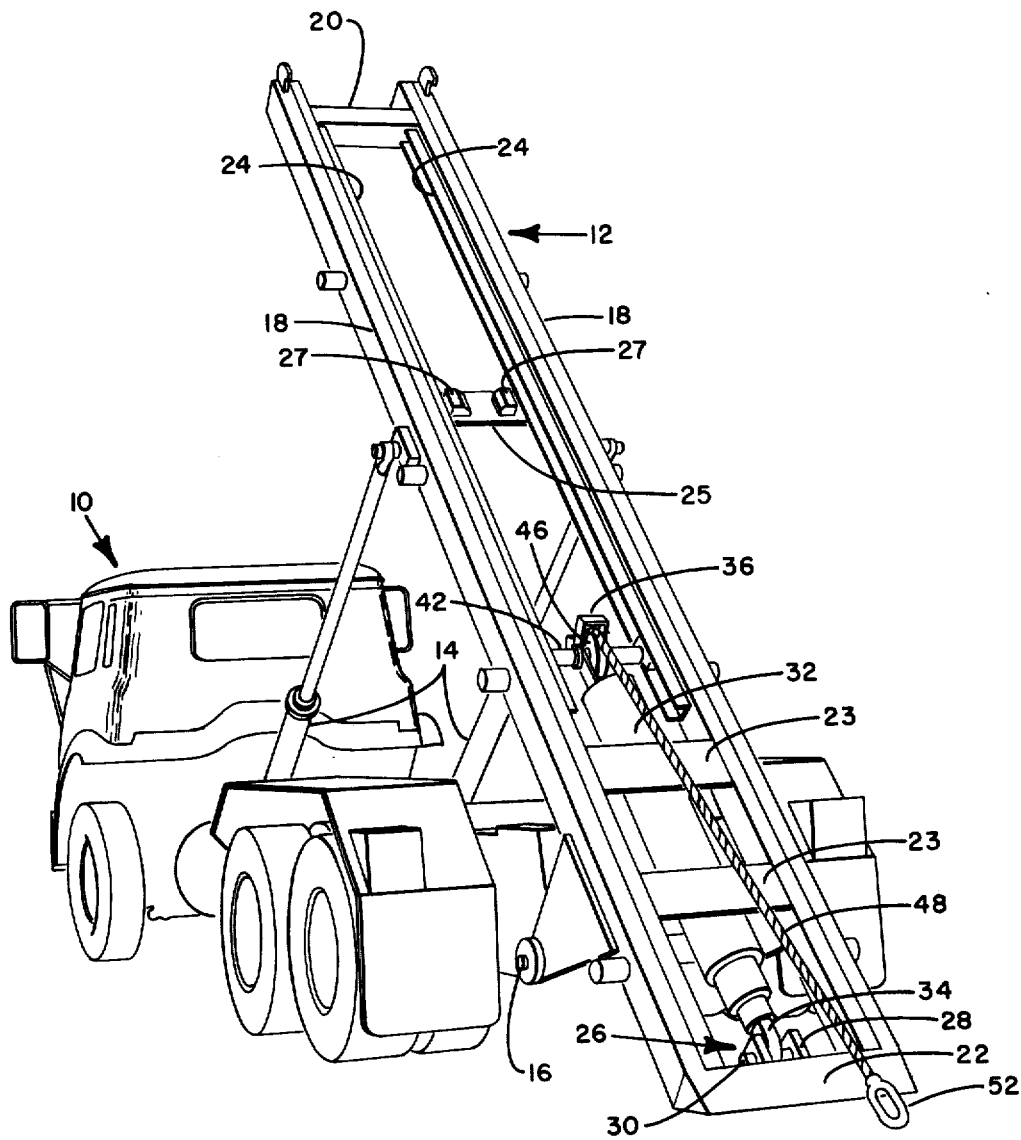
FIG. 1 is a perspective view of a container transport vehicle embodying the present invention with a tilting frame in an elevated, loading or unloading position.

Referring to FIG. 1 there is seen a container transport vehicle 10 having a tilting frame generally designated 12 mounted on the rear body portion thereof. The tilting frame is shown in an elevated position preparatory to loading or unloading a container onto or off of the tilting frame and the vehicle body. The tilting frame 12 is elevated and held in an elevated position by means of a pair of hydraulic lift cylinders 14. The frame pivots about a point 16 on the vehicle body 10 in such a manner that as the forward end of the tilting frame 12, that is the end of the tilting frame towards the forward portion of the vehicle, is elevated the rear portion of the tilting frame drops downward to ground level.

The tilting frame 12 consists of two parallel side frame members 18 which act as supports and guides for a container to be loaded on the vehicle. The frame members 18 are structurally spaced by front cross member 20, a rear cross member 22 and two intermediate cross members 23. A crossplate 25 is attached widthwise across the tilting frame and supports or stops 27 are mounted on the crossplate.

Within the two parallel frame members 18 are two guide members 24. FIG. 1 shows the guide members to be U-shaped channels. The guide members 24 are open at the rear end and secured, as by welding or other means, to the inside of the parallel side frame members 18. The guide channels 24 extend from a point at or near the front of the tilting frame to a point short of the rear of the tilting frame. On the inside of the rear cross member 22 there is mounted a hydraulic cylinder mounting member 26 comprising a yoke 28 secured to and extending outward from the cross member. Each arm of the yoke has a hole therein, in alignment, to receive a pin 30. The pin 30 is adapted to be inserted in the holes in the bracket to support a hydraulic cylinder or to be removed therefrom for disengagement of the hydraulic cylinder.

Figure 4:
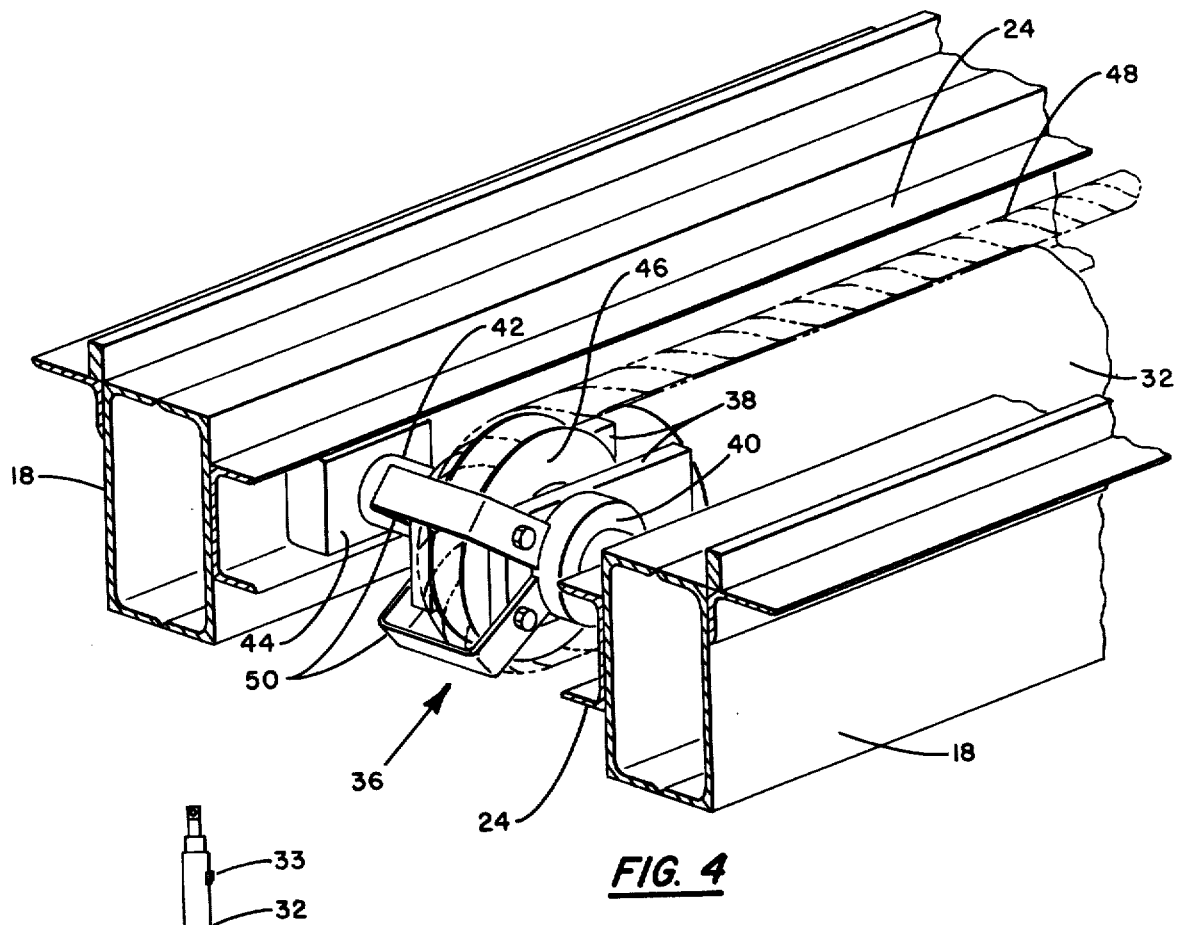
FIG. 4 is a perspective of a portion of the tilting frame and cylinder taken along lines 4—4 of FIG. 2.

A telescopic hydraulic cylinder 32 is mounted between the frame members 18. The rod end 34 of the cylinder is attached to the tilting frame 12 by pin 30 extending through the yoke 28 in the mounting member 26. The forward or cylinder end of the hydraulic cylinder 32 is supported in the guide channels 24 by means of a crosshead or support member indicated generally as 36 and shown in detail in FIG. 4. A pair of brackets 38 are rigidly secured to the forward end of the cylinder 32 and each have a bearing 40 adapted to support a shaft 42. The shaft 42 extends through the bearings in the support members and terminate at each end in sliding members 44. As disclosed in FIGS. 1 and 4, the sliding member consists of a pair of blocks 44. The sliding blocks 44 are mounted in guide channels 24 so that the guide channels support the cylinder 32 and allow the cylinder to extend and retract as the blocks slide forwardly and rearwardly in the channels. The blocks 44 are closely fitted to the guide channels to prevent upward movement without impairing movement along the channel. A sheave 46 rotatably mounted on the shaft 42 between the brackets 38 serves as a guide for a cable 48. A pair of U-shaped retaining members 50 extend over the sheave 46 to prevent the cable 48 from coming off the sheave. One end of the cable 48 is secured to the tilting frame 12 at the rear cross member 22 beneath the cylinder 32 as seen in FIG. 3. The cable 48 extends from the rear cross member 22 beneath the cylinder to the sheave 46, around the sheave then back to the rear of the tilting frame, terminating in a connector such as a hook or ring 52. The length of the cable is sufficient to extend from the rear cross member to the forwardmost point of travel of the sheave as the cylinder is extended without the hook 52 interferring with the sheave.

Figure 5:
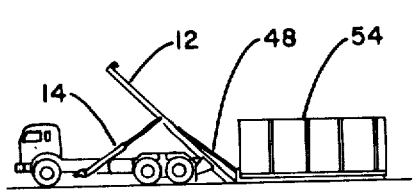
FIG. 5 is a side view of a container and a transport vehicle in a position prior to loading the container of the vehicle body.
Figure 6:
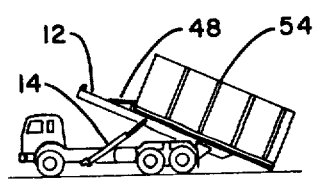
FIG. 6 is a side view of a container and a transport vehicle in a position with the container partially loaded on the vehicle body.
Figure 7:
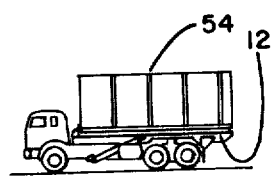
FIG. 7 is a side view of a container and a transport vehicle with the container loaded on the vehicle body.

The loading and unloading of a container can be seen in FIGS. 5, 6 and 7. When a container 54 is on the ground, the vehicle is backed up to the container and the tilting frame 12 is elevated to the position shown in FIG. 5 by the hydraulic cylinders 14. The ring 52 is placed on a hook, not shown, on the front lower portion of the container. The hydraulic cylinder 32 is extended advancing the sliding blocks 44 in the guide channels 24 and moving the sheave 46 forward. Since one end of the cable 48 is restrained, the end of the cable 48 attached to the container advances at half the rate of movement of the sheave, drawing the container up onto the tilting frame 12 as seen in FIG. 6. The tilting frame 12 is lowered by the cylinders 14 and the cylinder 32 continues to extend until the container reaches its forwardmost position on the vehicle as shown in FIG. 7.

Figure 11:
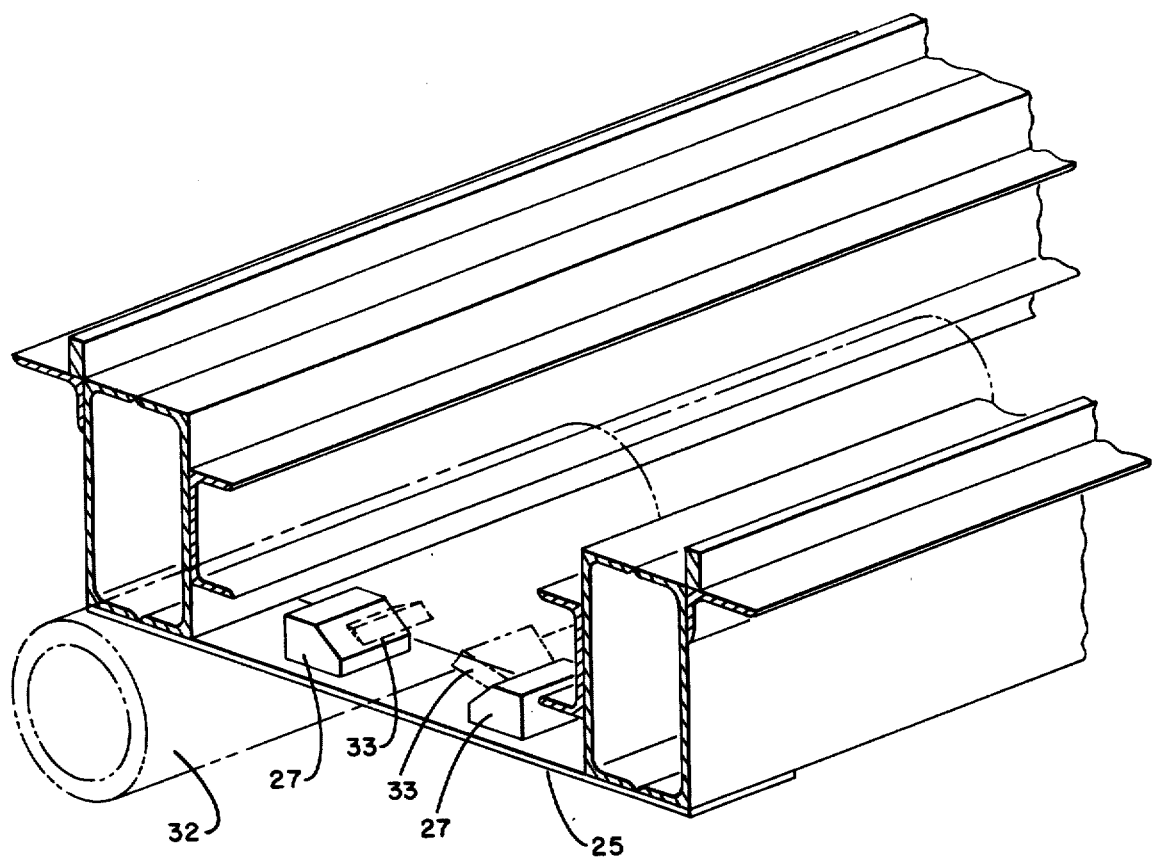
FIG. 11 is a perspective view of a portion of the tilting frame and cylinder taken along lines 10—10 of FIG. 2 with the hydraulic cylinder shown in an extended position and the cylinder lugs resting on the supports.
Figure 10:
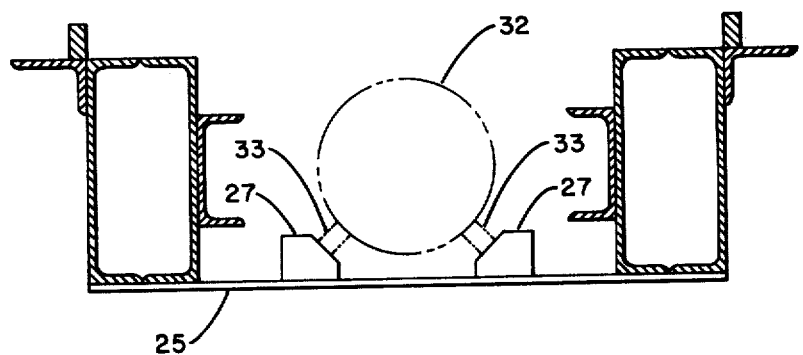
FIG. 10 is a front sectional view of the tilting frame taken along line 10—10 of FIG. 2 with the hydraulic cylinder shown in an extended position and the cylinder lugs resting on the supports.

Referring to FIGS. 10 and 11, the cylinder 32 is shown in the fully extended position. A pair of cylinder lugs 33, shown as tapered blocks, are secured to the lower half of the cylinder 32 and rest on, or just above, supports or stops 27. The bearing surface of each support or stop 27 is a flat rectangular surface set so that a cylinder lug 33 rests flat on one just above it.

The container can be removed from the vehicle by reversing the procedure. That is, the tilting frame 12 is elevated by the cylinders 14 and the container is allowed to slide rearwardly as the cylinder 32 is retracted. With the container on the ground, the cable 48 is disconnected from the container and the tilting frame is lowered to its original position on the vehicle. As seen in FIG. 5, the cable 48 is not parallel to the tilting frame 12 or the cylinder 32 as it draws the container upward.

There is a component force normal to the cylinder which tends to bend the cylinder. Since this component force acts through the center of the sheave 46 and shaft 42, it is taken up by the sliding blocks 44 and the guide channels 24 thus preventing any bending of the cylinder 32.

Figure 8:
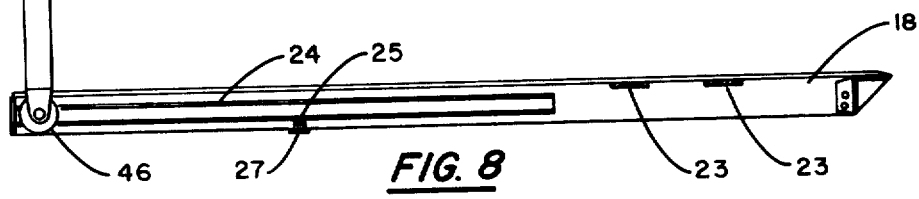
FIG. 8 is a partial side sectional view of the tilting frame taken along lines 3—3 of FIG. 2 and showing the cylinder disconnected from the tilting frame and rotated 90°.
Figure 9:
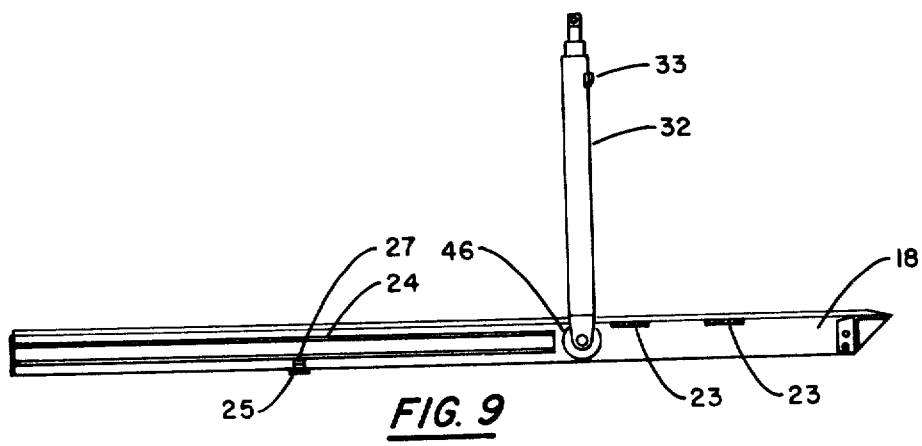
FIG. 9 is a partial side sectional view as in FIG. 8 with cylinder moved rearward in a position to be removed from the tilting frame.

In the system disclosed, the cylinder 32 can be removed for maintenance or replacement purposes merely by removing pin 30 from yoke 28. Removal of any additional parts of the tilting frame or vehicle is unnecessary. After removal of the pin 30, the entire cylinder 32 is moved forward on the sliding blocks 44 in channels 24. The rear end of the cylinder is elevated to the position shown in FIG. 8. With the cylinder in a vertical position, the entire cylinder is moved, by sliding the blocks 44, rearwardly in the channels 24 until the blocks leave the channel as shown in FIG. 9. The cylinder may then be removed or lifted out off the tilting frame. Replacement of the cylinder is effected by reversing the procedure.

While the invention has been illustrated and described in one embodiment, it is recognized that variations and changes may be made therein without departing from the invention as set forth in the claims.

What is claimed is:

1. Apparatus for loading and unloading containers onto and off of a vehicle body comprising
    a tilting frame mounted on the vehicle body for vertical pivotal movement about the rear of the vehicle body, and including at least two spaced, substantially parallel, frame members,
    a guide member mounted on the inside of each of the frame members,
    a support member extending between the guide members and movably supported by the guide members for movement along a portion of the length of the tilting frame,
    a sheave concentrically mounted on and rotatable about the support member,
    a hydraulic cylinder positioned between the frame members, extending substantially parallel thereto, having a first end secured to the support member so that movement of the hydraulic cylinder causes the support member and the sheave to move forward and backward along the tilting frame, and having a bracket located at a second end thereof wherein the bracket defines a hole,
    a rear cross member extending widthwise across the rear of the tilting frame,
    a hydraulic cylinder mounting means located substantially at the rear of the tilting frame for supporting the second end of the hydraulic cylinder, and including
    a yoke secured to and extending outward from the rear cross member, and having a pair of arms wherein the arms define a pair of aligned holes, and
    a disengageable pin extending through the hole defined by the bracket and the holes defined by the arms of the yoke for disengageably securing the second end of the hydraulic cylinder to the tilting frame,
    a cable having a first end secured to the tilting frame beneath the hydraulic cylinder, and having a second end extending around the sheave and toward the rear of the tilting frame so that movement of the sheave causes movement of the second end of the cable, and
    means on the second end of the cable to attach the cable to a container to be loaded onto the vehicle, and wherein
    the guide members extend to a point short of the rear of the tilting frame and are open at their rear end so that the support member can be removed from the rear of the guide members after the second end of the hydraulic cylinder is disengaged from the tilting frame to remove the hydraulic cylinder from the tilting frame.

2. The apparatus of claim 1 wherein the support member is attached at each end to a movable member slidably supported and vertically restrained by the guide members, and
    the guide members extending along a substantial portion of the tilting frame.

3. The apparatus of claim 1 further including
    means to support the hydraulic cylinder against vertical movement when the hydraulic cylinder is in an extended position.